United States Patent

Hoshiba et al.

[11] Patent Number: 5,813,216
[45] Date of Patent: Sep. 29, 1998

[54] SOLID WRITING TOOL AND METHOD OF ERASING LINES DRAWN THEREWITH

[75] Inventors: Masaaki Hoshiba, Fukioka; Toshiyuki Kawanishi, Numazu, both of Japan

[73] Assignee: Mitsubishi Pencil Kabushiki Kaisha, Tokyo, Japan

[21] Appl. No.: 562,879

[22] Filed: Nov. 27, 1995

[30] Foreign Application Priority Data

Nov. 29, 1994 [JP] Japan ................................. 6-294134

[51] Int. Cl.⁶ ...................................................... D06B 1/14
[52] U.S. Cl. ........................................ 68/202; 134/122 R
[58] Field of Search ......................... 68/200, 202, 205 R; 134/69 R, 122 R

[56] References Cited

U.S. PATENT DOCUMENTS

| | | | |
|---|---|---|---|
| 3,701,269 | 10/1972 | Wilcox | 68/202 |
| 3,848,439 | 11/1974 | Lopata | 68/202 |
| 3,862,553 | 1/1975 | Schwemmer et al. | 68/202 |
| 5,235,829 | 8/1993 | Belluzzi | 68/202 |
| 5,288,322 | 2/1994 | Hanna et al. | 68/205 R |

*Primary Examiner*—Frankie L. Stinson
*Attorney, Agent, or Firm*—Darby & Darby

[57] ABSTRACT

There are disclosed a solid writing tool which makes it possible to reuse an image holding-supporting member by erasing lines drawn on the image holding-supporting member, and a method of erasing the lines drawn with the above solid writing toll. The solid writing tool contains as a binder 50 to 90 weight % of a thermoplastic resin for toner having a softening point falling within a range of −40° to +60° C. from the temperature of a peeling roller, and 3 to 30 weight % of a lubricant. The drawn line-erasing method comprises dipping an image holding-supporting member on which lines are drawn with the solid writing tool into a peeling liquid containing water, and then erasing the lines by heat and pressure with a peeling roller and a heating roller.

5 Claims, 1 Drawing Sheet

# SOLID WRITING TOOL AND METHOD OF ERASING LINES DRAWN THEREWITH

BACKGROUND OF THE INVENTION (1) Field of the Invention

The present invention relates to a solid writing tool and a drawn line-erasing method of erasing lines drawn therewith. More specifically, the present invention relates to a solid writing tool which can draw lines that can be erased together with images obtained by a dry electrophotography, and a method of erasing lines drawn therewith.

(2) Description of the Related Art

The spread of OA apparatus such as copying machines, laser beam printers and facsimiles in recent years is accompanied with an increase in a paper consumption. The existing state is that almost all used papers are thrown away without reusing.

In view of the preceding state, proposed is a method in which only toner of images obtained by a dry electrophotography on an image holding-supporting member at least a part of which is constituted of chartaceous layers containing cellulose fibers as a main component is selectively removed to erase the images for effective use of paper resources by tracing inversely a heat fixing process in the dry electrophotography (EP 0587024 A2).

In this method, images are erased with a removing equipment A as shown in FIG. 1, wherein an image holding-supporting member on which toner is fixed by the heat fixing process in the dry electrophotography is fed to a peeling roller 5 on which a peeling liquid containing water 7 is coated by means of a liquid feeding roller 6 from a paper feeding tray 1 via a paper feeding roller 2, a guide plate 3, and a transporting roller 4; an adhesive force between the toner and the image holding-supporting member is reduced by causing the preceding peeling liquid containing water to permeate the toner fixed on the image holding-supporting member; the toner is melted by heat and pressure exerted with the peeling roller 5 and a heating roller 8, thereby removing the toner from the image holding-supporting member.

However, since erasable things with this method are restricted to images obtained by the dry electrophotography, written and printed things other than those images can not be erased, and this problem has to be solved in order to reuse an image holding-supporting member.

Accordingly, when an image holding-supporting member is reproduced with this erasing method, such a writing tool as lines drawn therewith can be erased from the image holding-supporting member together with toner images is required. However, writing tools which can draw lines that can be erased by the above method have not ever been available.

SUMMARY OF THE INVENTION

In view of the existing state described above, an object of the present invention is to provide a solid writing tool for making it possible to reuse an image holding-supporting member at least a part of which is constituted from chartaceous layers containing cellulose fibers as a main component by erasing lines drawn with the above writing tool together with toner images printed by a dry electrophotography, and to provide a drawn line-erasing method for erasing lines drawn therewith.

Intensive investigations made by the present inventors in order to solve the problems described above have resulted in finding that the above problems can be solved by making use of specific organic high molecular substances usable as a binder for toner in a dry electrophotography as a main component for a binder of a solid writing tool, and coming to complete the present invention.

That is, the solid writing tool of the present invention uses a thermoplastic resin for toner, having a softening point falling within a range of $-40°$ to $+60°$ C. from a temperature of a peeling roller, as a binder for the solid writing tool. The blending amount thereof is preferably 50 to 90 weight %, and the blending amount of a lubricant is preferably 3 to 30 weight %. The above thermoplastic resin for toner includes, for example, a styrene-acrylic copolymer and the like.

The method of erasing lines drawn with the solid writing tool of the present invention is characterized in that lines drawn with the above solid writing tool are erased by heat and pressure with a peeling roller after an image holding-supporting member on which lines are drawn with the solid writing tool is dipped in a peeling liquid containing water.

Further, the writing tool of the present invention is characterized in that the lines drawn with the said writing tool can be erased by the drawn-line erasing method described above.

Usually, images obtained by a dry electrophotography are fixed by a heat fixing process, in which pressure is applied to toner while melting the toner with a heating roller and the toner are then cooled and solidified on the surface of cellulose fibers of an image holding-supporting member, whereby the toner are firmly fixed on the image holding-supporting member.

A method of erasing fixed toner from an image holding-supporting member can be achieved by tracing inversely the above heat fixing process. That is, an adhesive force between the image holding-supporting member and the toner is reduced by dipping the image holding-supporting member on which the toner are fixed into a peeling liquid containing water. Then, heat is applied to melt the toner, and pressure is exerted to transfer only the toner onto a peeling roller, whereby the toner can be removed from the image holding-supporting member to erase images.

In the present invention, lines drawn on an image holding-supporting member can be erased due to using organic high molecular substances usable as a binder for toner in a dry electrophotography as a main component for a binder of the solid writing tool like a case where images obtained by the dry electrophotography are erased from an image holding-supporting member. That is, an adhesive force between the image holding-supporting member and the drawn lines is reduced by dipping the image holding-supporting member on which the lines are drawn with the solid writing tool into a peeling liquid containing water. Then, heat is applied to melt the lines and pressure is exerted, whereby the lines are transferred onto a peeling roller without penetrating into gaps among cellulose fibers of the image holding-supporting member, since a binder for toner is used as the main component of a binder for the solid writing tool. This makes it possible to erase the drawn lines from the image holding-supporting member.

DESCRIPTION OF THE SIGNS

Figure 1:
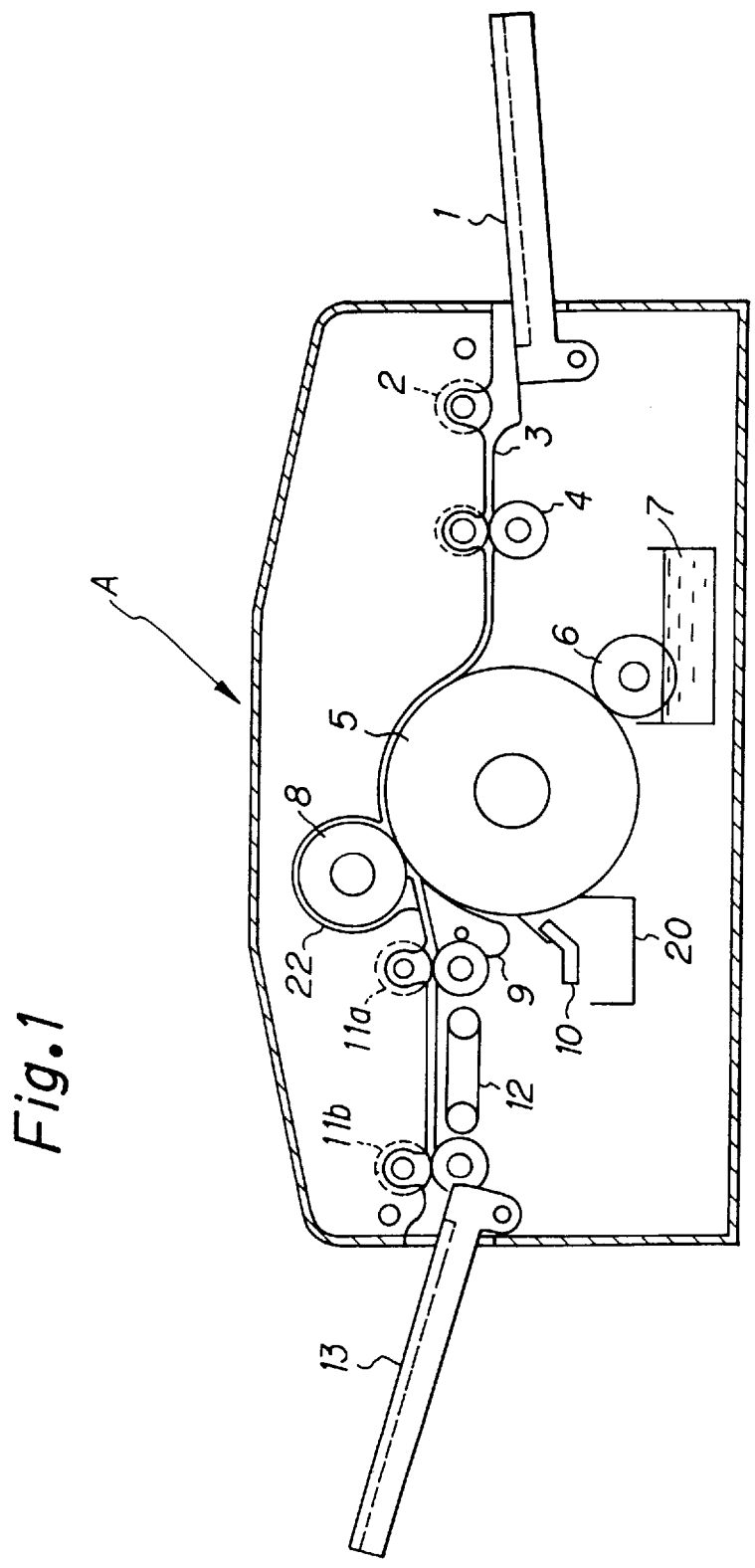
FIG. 1 is a schematic drawing showing one example of an apparatus which embodies the drawn line-erasing method of the present invention.

1 Paper feeding tray
2 Paper feeding roller

3 Guide plate
4 Transporting roller
5 Peeling roller
6 Liquid feeding roller
7 Peeling liquid
8 Heating roller
9 Separation claw
10 Toner cleaning portion
11a, b Transporting rollers
12 Drying belt
13 Paper discharging tray
20 Toner collecting portion
22 Transporting rib

DETAILED DESCRIPTION OF THE PREFERRED EMBODIMENTS

The drawn line-erasing method of the present invention is characterized in that lines drawn on an image holding-supporting member with the solid writing tool are dipped into a peeling liquid containing water and then erased by applying heat and pressure with a peeling roller.

One example of the drawn line-erasing method of the present invention includes a method in which drawn lines are erased with a removing equipment A shown in FIG. 1, wherein an image holding-supporting member on which lines are drawn with the solid writing tool of the present invention is fed to a peeling roller 5 on which a peeling liquid containing water 7 is coated by means of a liquid feeding roller 6 from a paper feeding tray 1 via a paper feeding roller 2, a guide plate 3, and a transporting roller 4; an adhesive force between the drawn lines and the image holding-supporting member is reduced by causing the preceding peeling liquid containing water to permeate the lines drawn on the image holding-supporting member; the lines drawn with the solid writing tool are melted by heat and pressure applied with the peeling roller 5 and a heating roller 8, thereby removing the lines from the image holding-supporting member.

The peeling liquid containing water used in the drawn line-erasing method of the present invention is used for reducing an adhesive force between an image holding-supporting member and drawn lines. For example, an aqueous liquid containing a surface active agent, an aqueous liquid of a water soluble polymer, and the mixtures thereof can be used as the peeling liquid.

There may be used the surface active agents such as anionic surface active agents shown in the following Table 1, cationic surface active agents shown in the following Table 2, amphoteric surface active agents shown in the following Table 3, nonionic surface active agents shown in the following Table 4, and fluorine series surface active agents shown in the following Table 5. The concentration of these surface active agents is 0.01 to 20 weight %.

TABLE 1

| Anionic surface active agents | |
|---|---|
| 1. Carboxylic acid salts | Soaps $RCOO^-$<br>N-acylamino acid salts $RCON-COO^-$<br>Alkylether carboxylic acid salts $RO(C_2H_4O)_nCOO^-$<br>Acylated peptides $RCO(NR'CO)_nCOO^-$<br>$R, R' = C_{12}\sim C_{18}$ |
| 2. Sulfonic acid salts | Alkylsulfonic acid salts $RSO_3^-$<br>Alkylbenzene- and alkylnaphthalenesulfonic acid salts |

TABLE 1-continued

| Anionic surface active agents | |
|---|---|
| | $R-\bigcirc-SO_3^-$  $R-\bigcirc\bigcirc-SO_3^-$<br>Mono or di-alkylsulfosuccinic acid salts<br>$R-OOCCH_2CH(SO_3^-)COOR$<br>α-Olefinsulfonic acid salts<br>N-acylsulfonic acid salts $RCON-SO_3^-$<br>$R = C_{12}\sim C_{18}$ |
| 3. Sulfuric acid ester salts | Sulfurized oil<br>Alkylsulfuric acid salts $ROSO_3^-$<br>Alkylether sulfuric acid salts $RO(C_2H_4O)SO_3^-$<br>Alkyl arylethersulfuric acid salts<br>$R-\bigcirc-O(C_2H_4O)_nSO_3^-$<br>Alkylolamide sulfuric acid salts $RCONH-OSO_3^-$<br>$R = C_{12}\sim C_{18}$ |
| 4. Phosphoric acid ester salts | Alkylphosphoric acid salts<br>$$O=P(-O^-)(-OR)(-O^-),\ O=P(-O^-)(-OR_2)(-R_1)$$<br>Alkylether phosphoric acid salts<br>$$O=P(-O^-)(-O(C_2H_4O)_nR)(-O^-),\ O=P(-O(C_2H_4O)_nR_1)(-O(C_2H_4O)_nR_2)(-O^-)$$<br>Alkyl arylether phosphoric acid salts<br>$R, R_1, R_2 = C_{12}\sim C_{15}$ |

TABLE 2

Cationic surface active agents

1. Aliphatic amine salts and quaternary ammonium salts thereof $R_2-N.X(R_1)(R_3)$   $R_1 = C_{12}\sim C_{18}$
$R_2, R_3$ = H or $CH_3$
X = organic acid or inorganic acid $$[R_1-N(CH_3)(CH_3)-R_2]^+ \ X^-$$
$R_1 = C_{12}\sim C_{18}$
$R_2 = C_{12}\sim C_{18}, CH_3$
X = Cl, Br, I 2. Aromatic quaternary ammonium salts $$[R_1-N(R_2)(CH_3)-CH_2-\bigcirc]^+\ X^-$$
$R_1 = C_{12}\sim C_{18}$
$R_2 = CH_3, C_{12}\sim C_{18}$
X = Cl, Br, I Benzalkonium salts
Benzethonium chloride 3. Heterocyclic quaternary ammonium salts $$[\bigcirc-N-R]^+\ X^-$$
R = $C_{12}\sim C_{18}$
X = Cl, Br, I

TABLE 2-continued

Cationic surface active agents

Pyridinium salts $$\left[ R^1 - \underset{\underset{R_2 \quad R_3}{\diagdown N \diagup}}{\overset{N}{\diagup\!\!\!\diagdown}} \right]^+ X^- \quad \begin{array}{l} R_1 = C_{12}\text{~}C_{18} \\ R_2 = CH_2CH_2OH, CH_3, -\!\!\left\langle\!\!\bigcirc\!\!\right\rangle\!, \text{etc.} \\ X = Cl, Br, I \end{array}$$

Imidazolinium salts

TABLE 3

Amphoteric surface active agents

A. Betaine
1. Carboxybetaine $$R_1 - \underset{\underset{R_3}{|}}{\overset{\overset{R_2}{|}}{N^+}} - (CH_2)_n COO^- \quad \begin{array}{l}(R_1 = C_{12}\text{~}C_{18}, \\ R_2, R_3 = CH_3 \\ n = 1\text{~}2)\end{array}$$

2. Sulfobetaine $$R_1 - \underset{\underset{R_3}{|}}{\overset{\overset{R_2}{|}}{N^+}} - (CH_2)_n SO_3^- \quad \begin{array}{l}(R_1 = C_{12}\text{~}C_{18}, \\ R_2, R_3 = CH_3 \\ n = 1\text{~}2)\end{array}$$

B. Aminocarboxylic acid salts $$R - \overset{+}{N}H_2 - (CH_2)_n COO^- \quad \begin{array}{l}(R = C_{12}\text{~}C_{18} \\ n = 1\text{~}2)\end{array}$$

C. Imidazoline derivatives $$R - \underset{}{\overset{N\diagup\!\!\!\diagdown}{\underset{\diagdown N^+\diagup}{\|}}} \underset{\diagdown CH_2COO^-}{\diagup CH_2CH_2OH} \quad (R = C_{12}\text{~}C_{18})$$

TABLE 4

Nonionic surface active agents

1. Ether type
   Alkyl- and alkylaryl polyoxyethylene ether
   Alkylaryl formaldehyde-condensed polyoxyethylene ether
   Block polymer containing polyoxypropylene as a lipophilic group
   Polyoxyethylene polyoxypropylene alkyl ether
2. Ether ester type
   Polyoxyethylene ether of glycerine ester
   Polyoxyethylene ether of sorbitan ester
   Polyoxyethylene ether of sorbitol ester
3. Ester type
   Polyethylene glycol fatty acid ester
   Glycerine ester
   Polyglycerine ester
   Sorbitan ester
   Propylene glycol ester
   Sucrose ester
4. Nitrogen-containing type
   Fatty acid alkanolamide
   Polyoxyethylene fatty acid amide

TABLE 4-continued

Nonionic surface active agents

Polyoxyethylene alkylamine
Amine oxide

TABLE 5

Fluorine series surface active agents

The fluorine series surface active agents include the following four kinds like conventional surface active agents.
    (1) Anionic type
    (2) Nonionic type
    (3) Cationic type
    (4) Amphoteric type
Fluoroalkyl($C_2$~$C_{20}$) carboxylic acids
Disodium N-perfluorooctanesulfonyl glutamate
Sodium 3-[fluoroalkyl($C_6$~$C_{11}$)oxy]-1-alkyl($C_3$~$C_4$) sulfonate
Sodium 3-[ω-fluoroalkanoyl($C_6$~$C_8$)-N-ethylamino]-1-propane sulfonate
N-[3-(perfluorooctane sulfonamide)propyl]-N,N-dimethyl-N-carboxymethylene ammonium betaine
Perfluoroalkyl carboxylic acids ($C_7$~$C_{13}$)
Perfluorooctane sulfonic acid diethanolamide
Perfluoroalkyl($C_4$~$C_{12}$)sulfonic acid salts (Li, K, Na)
N-propyl-N-(2-hydroxyethyl)perfluorooctane sulfonamide
Perfluoroalkyl($C_6$~$C_{10}$)sulfonamidepropyl trimethyl-ammonium salts
Perfluoroalkyl($C_6$~$C_{10}$)-N-ethylsulfonyl glycine salts (K)
Bis(N-perfluorooctyl sulfonyl-N-ethylaminoethyl) phosphoric acid ester
Monoperfluoroalkyl($C_6$~$C_{16}$)ethyl phosphoric acid ester Water soluble polymers shown in the following Table 6 may be used as a water soluble polymer. The concentration of these water soluble polymers is 0.1 to 20 weight %.

TABLE 6

Water soluble polymers

1. Natural polymers
   *Starches-sweet potato starch, potato starch, tapioca starch, corn starch
   *Mannan-devil's tongue
   *Sea weeds-glue plant, agar, sodium alginate
   *Plant mucilages-hibicus, tragacanth, gum arabic
   *Microbiological mucilages-dextran, levan
   *Proteins-glue, gelatin, casein, collagen
2. Semi-synthetic products
   *Celluloses-viscose, methyl cellulose, ethyl cellulose (EC), Hydroxy ethyl cellulose (HEC), carboxy methyl cellulose (CMC)
   *Starches-water soluble starch, carboxy methyl starch (CMS), dialdehyde starch
3. Synthetic products    polyvinyl alcohol (Poval), poly(sodium acrylate), polyethylene oxide, isobutylene-maleic acid In the drawn line-erasing method of the present invention, a temperature of a peeling roller is usually controlled to 80° to 120° C.

Next, the solid writing tool of the present invention is characterized in that lines drawn with the above writing tool can be erased by the drawn line-erasing method described above The above solid writing tool comprises 50 to 90 weight % of a binder comprising a thermoplastic resin for toner having a softening point falling within a range of −40° to +60° C.

from a temperature of a peeling roller, 3 to 30 weight % of a lubricant, a filler, a pigment, and if necessary, additives such as a plasticizer and a solvent.

The binders used for the solid writing tool of the present invention are not specifically restricted as long as they are thermoplastic resins used for toner in conventional dry electrophotography, and every one may be used. There may be used, for example, polystyrene resins such as a styrene-acrylonitrile copolymer, a styrene-isobutylene copolymer, and a styrene-butadiene copolymer, acrylic and methacrylic resins such as ethyl methacrylate polymer and a methyl methacrylate/butyl methacrylate copolymer, styrene-(meth) acrylylate copolymers, polyester series resins, a polyvinyl-butyral resin, polyamide resins, and polyolefin resins. As a matter of course, the mixtures of several kinds thereof may be used.

These thermoplastic resins have preferably a softening point falling within a range of −40° to +60° C. from a temperature of a peeling roller. The softening point falling in a range of −40° C. or lower from the temperature of a peeling roller causes a thermoplastic resin and a colorant to penetrate into gaps among cellulose fibers of an image holding-supporting member by a pressure of the peeling roller and makes it difficult to erase drawn lines. Meanwhile, if the softening point falls in a range of +60° C. or higher from the temperature of the peeling roller, the thermoplastic resin contained in the drawn lines does not soften by heat of the peeling roller and it remains fixed on the cellulose fibers together with a colorant without transferring onto the peeling roller, which makes it difficult to erase the drawn lines. Accordingly, such higher softening point is not preferred.

Further, the above toner may be used as it is as a binder containing a colorant and the like.

The more the blending amount of the preceding thermoplastic resin used as a binder for the solid writing tool of the present invention is, the more the erasing performance of drawn lines is improved. However, since lines are drawn on an image holding-supporting member abrading the core member of the solid writing tool, a lubricant is required to be blended into the solid writing tool.

Meanwhile, less blending amount of the above thermoplastic resin deteriorates the erasing performance of the drawn lines, and therefore the blending amount falls preferably in a range of 50 to 90 weight % based on the amount of the solid writing tool.

Further, for the purposes of enhancing characteristics of kneading while applying a high shearing force and characteristics of molding by extrusion, there may be added, according to necessity, at least one of organic plasticizers and solvents for binders, such as dioctyl phthalate (DOP), dibutyl phthalate (DBP), tricresyl phosphate (TCP), dioctyl adipate (DOA), propylene carbonate, alcohols, ketones, and esters. They are preferably removed from finished products from the viewpoint of an erasing performance.

There may be used as the pigment used for the solid writing tool of the present invention, all of well known inorganic pigments such as carbon black, graphite, black iron oxide, red iron oxide, Prussian blue, ultramarine blue, bronze powder, mica titan, titanium oxide, and zinc oxide, and all of well known organic pigments such as permanent red 4R, resol red (Ba), lake red C, pyrazolone orange, brilliant Bordeaux 10B, brilliant carmine 6B, disazo yellow AAA, phthalocyanine blue, phthalocyanine green, victoria blue lake, methyl violet lake, and synthetic resin solid solution type daylight fluorescent pigments. Further, the above toner may be used as it is as a colorant.

Lines are drawn on an image holding-supporting member with the solid writing tool while the core member is abraded, and therefore a lubricant is required to be blended in order to improve a writing feeling. There may be used as the lubricant used in the present invention, petroleum waxes such as paraffin wax and microcrystalline wax, well known waxes such as carnauba wax, candelilla wax, montan wax, bees wax, Japan wax, synthetic Japan wax, caster wax, stearic acid, and fatty acid amides, and well known metal soaps such as calcium stearate, zinc stearate, and aluminum stearate. As a matter of course, the mixtures thereof may be used.

A melting point of the lubricant and a temperature of the peeling roller have a close relation with the erasing performance of drawn lines. The temperature of the peeling roller is suitably determined according to a thermoplastic resin used for toner in a dry electrophotography, which is to be erased, and the peeling roller is usually used at 80° to 120° C.

Since the lubricant described above has a bad compatibility with almost all binders, the melting point of the lubricant falling in a range of −20° C. or lower from the temperature of the peeling roller reduces a melt viscosity of the lubricant and causes the lubricant to penetrate into gaps among cellulose fibers of an image holding-supporting member together with a colorant by a pressure of the peeling roller in erasing, which makes it difficult to erase drawn lines.

Meanwhile, if the melting point of the lubricant falls in a range of +30° C. or higher from the temperature of the peeling roller, the lubricant contained in the drawn lines does not soften by heat of the peeling roller and remains fixed on the cellulose fibers together with the colorant without transferring onto the peeling roller, which makes it difficult to erase the drawn lines. Since in the case where a polyolefin resin having a good compatibility with the lubricant is used for a binder, it is hard for the lubricant to separate from the binder, the melting point of the above lubricant falling out of a range of −50° to +30° C. from the temperature of the peeling roller makes it difficult to erase the drawn lines.

The blending amount of the preceding lubricant of less than 3 weight % based on the weight of the solid writing tool makes it difficult to abrade the core member on an image holding-supporting member in writing and thus deteriorates the coloring performance. Meanwhile, the blending amount of the lubricant exceeding 30 weight % causes the lubricant to remain on the image holding-supporting member together with a colorant regardless of the temperature of the peeling roller, which makes it difficult to erase drawn lines.

Accordingly, the lubricant having the melting point falling in a range of −20° C. to +30° C. from the temperature of the peeling roller is preferably blended into the solid writing tool in a proportion of 3 to 30 weight %. However, when the lubricant is well compatible with a binder, the melting point of the lubricant is required to be set in a range of −50° C. to +30° C. from the temperature of the peeling roller, and the blending amount of the said lubricant into the solid writing tool is preferably 3 to 30 weight %.

There may be blended into the solid writing tool, well known fillers such as calcium carbonate, clay, kaolin, talc, precipitated barium sulfate, boron nitride, mica, potassium titanate, potassium titanate fiber, titanium oxide whisker, aluminum borate whisker, and carbon fiber within a range that the mechanical strength can be satisfied.

In order to cause the composition of the solid writing tool to resemble more the composition of toner, a charge controller, additives and a surface treating agent which are conventionally added to the toner may be added to the solid writing tool of the present invention according to necessity. The above charge controller includes well known charge controllers such as azo series metal-containing dyes, nigrosine dyes, and fatty acid metal salts. The additives described above include well known additives such as liquid paraffin, acid amides, and chlorinated paraffin. The surface treating agent described above includes well known surface treating agents such as fine powders of hydrophobic silica and alumina.

EXAMPLES

Next, the present invention will be more specifically explained with reference to examples, but the present invention will never be restricted by these examples.

Example 1

| Styrene.acrylic copolymer (softening point: 120° C.) | 70 weight % |
| --- | --- |
| Zinc stearate (melting point: 120° C.) | 10 weight % |
| Carbon black | 10 weight % |
| Talc | 10 weight % |

Ethyl acetate corresponding to 100 weight % was further added to the blended composition described above, and these were mixed and dispersed with a kneader. Then, a solvent component was adjusted while kneading with two rolls, and after this kneaded composition was pelletized and the solvent was removed by drying up the pellets, it was molded by extruding with a single axis screw type extruder, whereby a solid writing tool of a pencil lead type having a diameter of 3 mm was prepared.

Example 2

| Toner (black: 10 weight % of carbon black; resin:styrene.acrylic copolymer, softening point: 120° C.) | 80 weight % |
| --- | --- |
| Zinc stearate (melting point: 120° C.) | 10 weight % |
| Talc | 10 weight % |

Ethyl acetate corresponding to 100 weight % was further added to the blended composition described above, and these were mixed and dispersed with a kneader. Then, a solvent component was adjusted while kneading with two rolls, and after this kneaded composition was pelletized and the solvent was removed by drying, it was molded by extruding with a single axis screw type extruder, whereby a solid writing tool of a pencil lead type having a diameter of 3 mm was prepared.

Example 3

| Toner (red: 10 weight % of permanent red 4R; resin: styrene.″″″″″″″acrylic copolymer, softening point: 120° C.) | 80 weight % |
| --- | --- |
| Zinc stearate (melting point: 120° C.) | 10 weight % |
| Talc | 10 weight % |

Ethyl acetate corresponding to 100 weight % was further added to the blended composition described above, and these were mixed and dispersed with a kneader. Then, a solvent component was adjusted while kneading with two rolls, and after this kneaded composition was pelletized and the solvent was removed by drying up the pellets, it was molded by extruding with a single axis screw type extruder, whereby a solid writing tool of a pencil lead type having a diameter of 3 mm was prepared.

Example 4

| Styrene · acrylic copolymer (softening point: 120° C.) | 18 weight % |
| --- | --- |
| Polyethylene (softening point: 90° C.) | 50 weight % |
| Paraffin wax (melting point: 58° C.) | 15 weight % |
| Carbon black | 7 weight % |
| Talc | 10 weight % |

After the blended composition described above was mixed and dispersed at 120° C. with a kneader, this kneaded composition was pelletized and molded by extruding with a single axis screw type extruder, whereby a solid writing tool of a crayon type was prepared.

Comparative Example 1

| Styrene · acrylic copolymer (softening point: 120° C.) | 30 weight % |
| --- | --- |
| Paraffin wax (melting point: 58° C.) | 25 weight % |
| Zinc stearate (melting point: 120° C.) | 25 weight % |
| Carbon black | 10 weight % |
| Talc | 10 weight % |

Ethyl acetate corresponding to 100 weight % was further added to the blended composition described above, and these were mixed and dispersed with a kneader. Then, a solvent component was adjusted while kneading with two rolls, and after this kneaded composition was pelletized and the solvent was removed by drying up the pellets, it was molded by extruding with a single axis screw type extruder, whereby a solid writing tool of a pencil lead type having a diameter of 3 mm was prepared.

Comparative Example 2

| Styrene · acrylic copolymer (softening point: 120° C.) | 30 weight % |
| --- | --- |
| Paraffin wax (melting point: 58° C.) | 25 weight % |
| Zinc stearate (melting point: 120° C.) | 25 weight % |
| Permanent red 4R | 10 weight % |
| Talc | 10 weight % |

Ethyl acetate corresponding to 100 weight % was further added to the blended composition described above, and these were mixed and dispersed with a kneader. Then, a solvent component was adjusted while kneading with two rolls, and after this kneaded composition was pelletized and the solvent was removed by drying up the pellets, they were molded by extruding with a single axis screw type extruder, whereby a solid writing tool of a pencil lead type having a diameter of 3 mm was prepared.

Comparative Example 3

| Styrene · acrylic copolymer (softening point: 120° C.) | 18 weight % |
| --- | --- |
| Polyethylene (softening point: 90° C.) | 15 weight % |
| Paraffin wax (melting point: 58° C.) | 50 weight % |
| Carbon black | 7 weight % |
| Talc | 10 weight % |

After the blended composition described above was mixed and dispersed at 120° C. with a kneader, this kneaded composition was pelletized and molded by extruding with a single axis screw type extruder, whereby a solid writing tool of a crayon type was prepared.

The solid writing tools prepared in Examples 1 to 4 and Comparative Examples 1 to 3 were used to evaluate the erasing performances. The results thereof are shown in the following Table 1.

The erasing performance was evaluated with an automatic writing test machine, wherein a test copy was written on an image holding-supporting member (PPC paper type 6200 manufactured by Ricoh Co., Ltd.) with the solid writing tool installed in the test machine described above while applying a load of 300 gf; then, a recycle copying machine (the temperature of the peeling roller: 100° C.) shown in FIG. 1, made on an experimental basis by Ricoh Co., Ltd. was used to erase the test copy; and the luminous reflectance y after erasing was measured with a spectrophotometer. The results thereof are shown in the following Table 7.

An aqueous solution containing 0.2 weight % of a non-ionic surface active agent Nikkol BT-7 (polyoxyethylene alkyl ether: manufactured by Nikko Chemicals Co., Ltd.) was used as a peeling liquid.

TABLE 7

|  | Luminous reflectance y |
|---|---|
| Example 1 | 81.5 |
| Example 2 | 80.6 |
| Example 3 | 81.5 |
| Example 4 | 80.3 |
| Comp. Example 1 | 48.1 |
| Comp. Example 2 | 58.3 |
| Comp. Example 3 | 47.2 |

Consideration on the results shown in Table 7

In summary, comparison with the luminous reflectance (84.2) of the image holding-supplying member before writing shows that the solid writing tools prepared in Examples 1 to 4 of the present invention have sufficiently high erasing performances as compared with those prepared in Comparative Examples 1 to 3 in which the blending amounts of a binder fall out of the range of the present invention.

What is claimed is:

1. A solid writing tool for line drawing on an image holding-supporting member, wherein the image holding-supporting member comprises chartaceous layers containing cellulose fibers, wherein said writing tool comprises 50 to 90% of a thermoplastic resin for toner, 3 to 30 wt. % of a lubricant and at least one component selected from the group consisting of a filler, a pigment, and an additive selected from the group consisting of a plasticizer and a solvent, wherein the thermoplastic resin has a softening point falling within a range of −40° to +60° C. from a temperature of a peeling roller, and wherein lines which are drawn on the image holding-supporting member with the solid writing tool are removed when the member is dipped into a peeling liquid containing water and passed through a peeling roller, whereby said lines are erased by heat and pressure.

2. A solid writing tool as described in claim 1, wherein the thermoplastic resin for toner is at least one selected from a styrene-acrylonitrile copolymer, a styrene-isobutylene copolymer, a styrene-butadiene copolymer, ethyl methacrylate polymer, a methyl methacrylate/butyl methacrylate copolymer, a styrene-acrylate copolymer, a styrene-methacrylate copolymer, a polyester resin, a polyvinylbutyral resin, a polyamide resin, and a polyolefin resin.

3. A solid writing tool as described in claim 1, wherein the lubricant has a melting point of 60° to 150° C.

4. A solid writing tool as described in claim 3, wherein the lubricant is at least one selected from paraffin wax, microcrystalline wax, carnauba wax, candelilla wax, montan wax, bees wax, Japan wax, synthetic Japan wax, caster wax, stearic acid, a fatty acid amide, calcium stearate, zinc stearate, and aluminum stearate.

5. A solid writing tool as described in claim 1, wherein the thermoplastic resin for toner is at least one selected from a styrene-acrylonitrile copolymer, a styrene-isobutylene copolymer, a styrene-butadiene copolymer, ethyl methacrylate polymer, a methyl methacrylate/butyl methacrylate copolymer, a styrene-acrylate copolymer, a styrene-methacrylate copolymer, a polyester resin, a polyvinylbutyral resin, a polyamide resin, and a polyolefin resin; and the lubricant is at least one selected from paraffin wax, microcrystalline wax, carnauba wax, candelilla wax, montan wax, bees wax, Japan wax, synthetic Japan wax, caster wax, stearic acid, a fatty acid amide, calcium stearate, zinc stearate, and aluminum stearate.

\* \* \* \* \*

UNITED STATES PATENT AND TRADEMARK OFFICE
CERTIFICATE OF CORRECTION

PATENT NO. : 5,813,216
DATED : September 29, 1998
INVENTOR(S) : Masaaki Hoshiba, et. al.

It is certified that error appears in the above-identified patent and that said Letters Patent is hereby corrected as shown below:

Title page, item [75], inventors, should read as following:

Delete "Fukioka" and insert therefor -- Fujioka --.

Signed and Sealed this

Twelfth Day of January, 1999

Attest:

Attesting Officer

Acting Commissioner of Patents and Trademarks